March 30, 1948. F. M. FRAGA 2,438,553
IMPLEMENT HITCH
Filed May 28, 1945 2 Sheets-Sheet 2
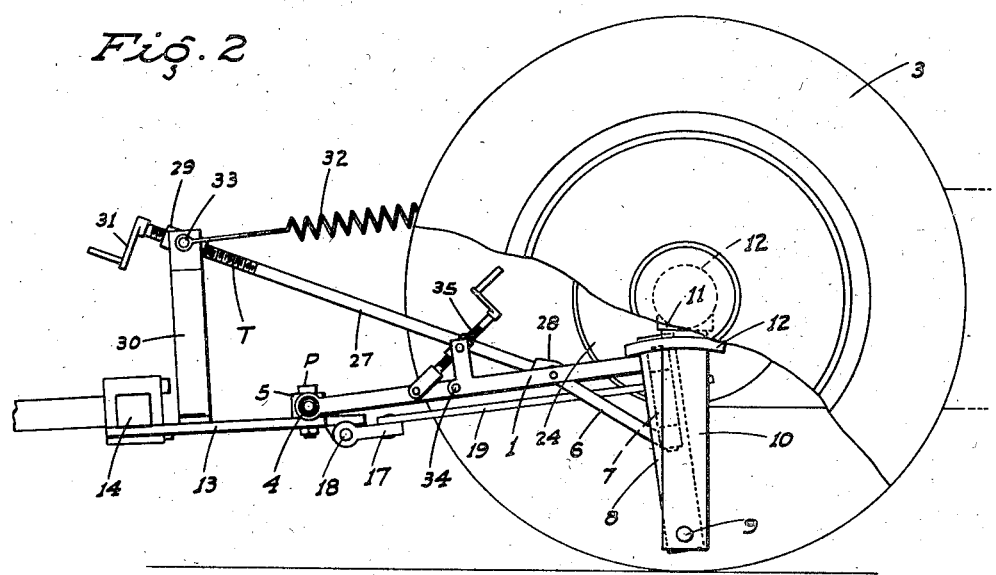
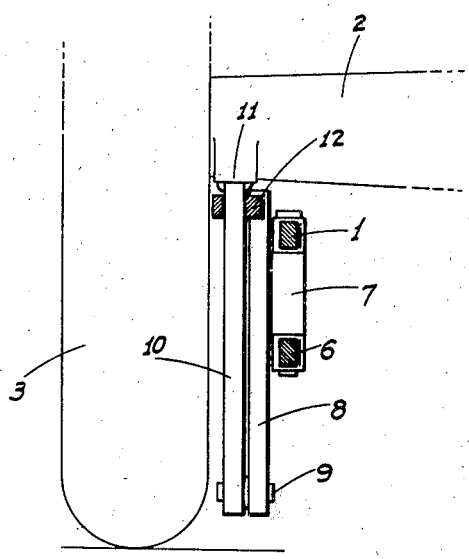
INVENTOR
Frank M. Fraga Patented Mar. 30, 1948

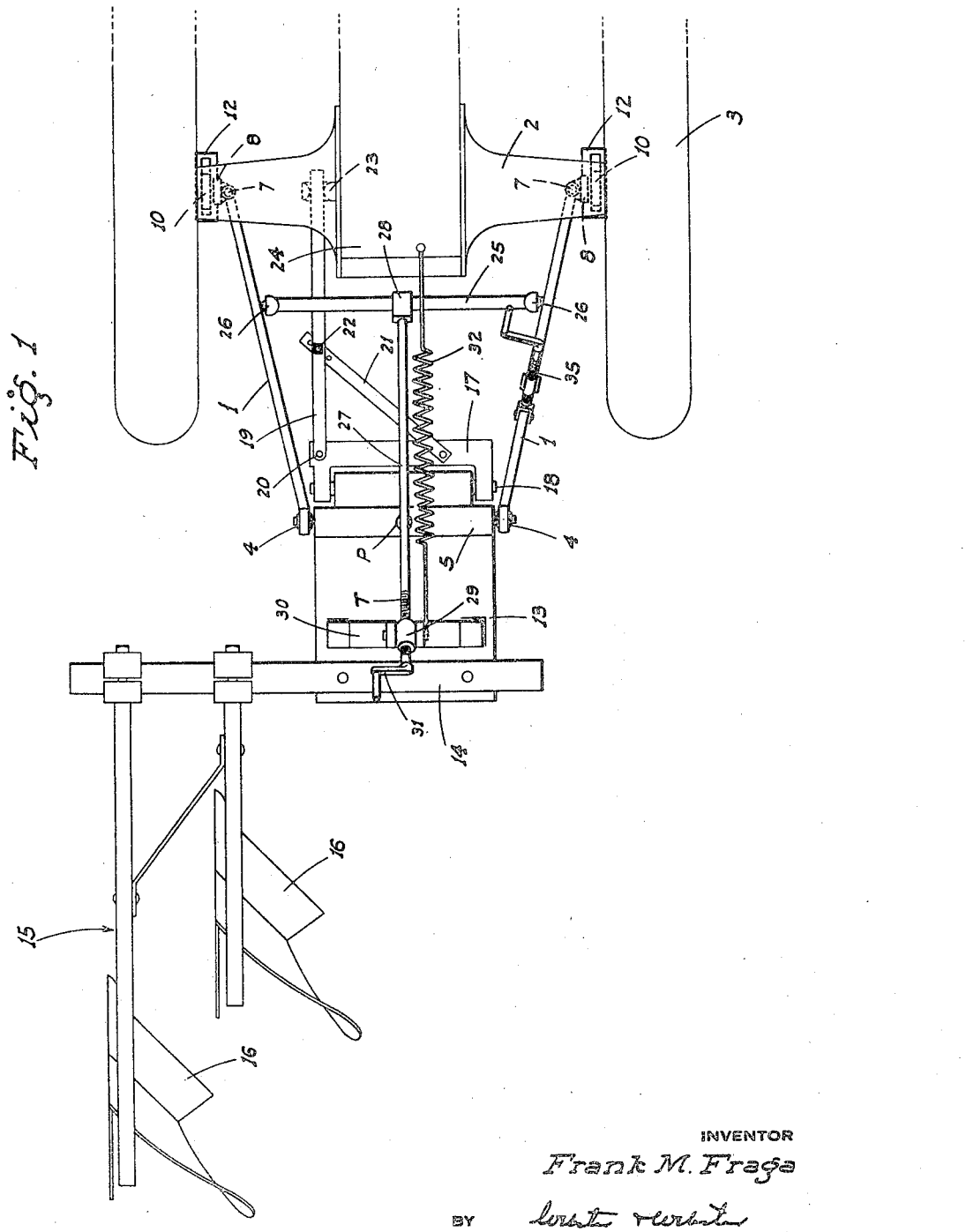

2,438,553

UNITED STATES PATENT OFFICE 2,438,553

IMPLEMENT HITCH

Frank M. Fraga, Fresno, Calif.

Application May 28, 1945, Serial No. 596,394

11 Claims. (Cl. 280—33.44)

This invention relates to, and it is an object to provide, an improved hitch for connecting a ground working implement, such as an offset plow or disc, in draft relation to a wheel tractor.

Another object of the present invention is to provide an implement-tractor hitch which is arranged to minimize the side draft or thrust which certain implements with conventional hitches normally and objectionably impart to the tractor ahead of the rear wheels thereof; such side thrust as is transmitted to the tractor by my hitch being directly at the rear wheels, which does not materially affect steering of the tractor and wholly eliminates any tendency of the side draft to turn the tractor. With my hitch the tractor steers neutral and it is not necessary to compensate, by steering, for the side draft of the implement.

An additional object of this invention is to provide a hitch which is operative, when connected between an implement and a wheel tractor, to exert the draft force on the tractor in such a manner as to urge the forward end of said tractor downwardly, whereby to maintain the front wheels of the tractor in proper and positive ground engagement.

Further objects of the instant invention are to provide a hitch which exerts a straight line pull on the implement; to provide a hitch which is arranged to facilitate ready lifting of the working portions of the implement out of the ground; and to provide a hitch having adequate centerline clearance between the rear wheels of the tractor.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a plan view of the hitch as connected between an offset plow and a wheel tractor.

Figure 2 is a side elevation of the hitch as connected between an implement and a tractor; the rear wheel of the tractor being partly broken away.

Figure 3 is an enlarged fragmentary cross section showing one of the hanger units employed to connect the draft links with the tractor.

Referring now more particularly to the characters of reference on the drawings, the hitch comprises a pair of rigid draft links 1 which extend rearwardly from points beneath the rear axle housings 2 of the tractor and adjacent the tractor rear wheels 3, in rearwardly converging relation; said draft links 1 being connected at their rear ends by flexible ball and socket couplings 4 with opposite ends of a rigid transversely extending drawbar 5. At their forward ends the draft links 1 are arranged in connection with the corresponding axle housings 2 by means of the following structure:

The forward ends of the draft links 1, together with corresponding ends of diagonal braces 6 secured to said draft links, are fixed by means of corresponding hinges 7 to the upper end portions of upstanding swing legs 8 pivotally connected at their lower ends, as at 9, to rigid hangers 10 which are fixed, as at 11, to the axle housings 2 and depend therefrom. The upstanding legs 8 are swingable in a vertical plane lengthwise of the tractor, while the hinges 7 mount the draft links 1 for swinging movement in a substantially horizontal plane transversely of the tractor. At their upper ends the upstanding swing legs 8 carry slotted guides 12, through which the upper portion of the hangers 10 project, whereby the legs 8 are maintained against lateral canting.

The drawbar 5 extends across and is vertically and centrally pivoted, as at P, in connection with a rigid, substantially rectangualr draft plate 13 intermediate the front and rear ends of the latter.

Adjacent its rear end the draft plate 13 is fixedly connected with a transverse tool bar 14 of the implement, here shown as an offset plow 15 which includes plow shares 16 disposed to one side of the longitudinal center line of the tractor.

Ahead of the drawbar 5 the draft plate 13 is fitted with a vertically swingable forwardly projecting yoke 17 which is generally U-shape in plan and carried at its ends on pivot pins 18 fixed in connection with said plate. A rigid thrust tongue 19 is pivotally connected at its rear end, as at 20, to the yoke 17 adjacent one end of the latter, and said tongue projects forwardly in substantially horizontal relation from said yoke. The tongue 19 is held in a selected position of adjustment by means of an adjustable diagonal brace 21 which extends from the yoke adjacent its other end to connection, as at 22, with the thrust tongue intermediate its ends. Adjacent its forward end the thrust tongue 19 slidably and rockably seats in an upwardly opening fixed cradle 23 secured on the corresponding side of the differential housing 24 of the tractor. This cradle permits of vertical rocking of the thrust tongue 19, as well as longitudinal sliding movement thereof, but limits lateral movement of said tongue, particularly at its forward end portion. The assembly of yoke 17, thrust tongue 19, brace 21, and cradle 23 is substantially the same as shown in my copending application, Serial No. 533,552, filed May 1, 1944, Pat. No. 2,379,225, issued June 26, 1945.

A cross bar 25 is connected at its ends to the draft links 1 intermediate the ends of the latter by means of ball and socket units 26. An elongated, tension screw 27 is turnably but axially immovably connected, as at 28, with the cross bar 25 centrally of the ends of the latter; the screw 27 extending at an upward and rearward incline from said cross bar 25. Adjacent its upper end the screw 27 is threaded, as at T, with said threaded portion extending through a tapped bushing 29 fixed on the upper end of an A-frame 30 rigidly secured on and upstanding from the draft plate 13 ahead of the tool bar 14. At its upper and free end the screw 27 is fitted with a hand crank 31.

The offset implement 15 produces a side draft which tends to rotate the plate 13 about the pivot P. When this occurs such rotative tendency transmits the side draft of such implement to the thrust tongue 19 as a lateral force which is applied to the cradle 23 and consequently to the tractor at a point in substantially the transverse plane of its rear axle. Thus, the side draft of the offset implement cannot swing the tractor to one side or the other about the rear wheels as a pivot point, and the tractor therefore steers normally.

Additionally, by reason of the connection of the draft links 1 in draft relation to the tractor adjacent its rear end and at a relatively low point, i. e. at the pivots 9, the draft force urges the tractor downwardly at its forward end, which maintains the front wheels in proper ground engagement, and prevents the tractor from accidentally tipping upwardly at said forward end.

The assembly of cross bar 25, crank-actuated screw 27, and upstanding A-frame 30 which carries the bushing through which said screw is threaded, is useful when it is desired to lift the ground working portions 16 of the implement 15 out of the ground. By turning the screw 27 in one direction, the draft plate 13, together with the implement, is urged upwardly, making it much easier to raise the implement out of ground working position.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A hitch adapted for connection between a tractor and implement, including a pair of transversely spaced draft links, means to connect said links at their forward end to the tractor, and a draft member connected in draft relation to the implement and to which member said links are flexibly secured at their rear ends; one of said draft links being rigid and the other of said links being articulated intermediate its ends for angular adjustment in a vertical plane, and adjustable holding means connected between the articulated portions of said one link.

2. A hitch adapted for connection between a tractor and implement, including a pair of transversely spaced draft links, means to connect said links at their forward end to the tractor, and a draft member connected in draft relation to the implement and to which member said links are flexibly secured at their rear ends; one of said draft links being rigid and the other of said links being articulated intermediate its ends for angular adjustment in a vertical plane, and adjustable holding means connected between the articulated portions of said one link, said holding means being a manually controlled screw unit.

3. A hitch adapted for connection between a wheel tractor and implement, including a pair of transversely spaced draft links, means to connect said links to the tractor adjacent the rear wheels thereof and some distance below the axis of said wheels, and a draft member connected in draft relation to the implement and to which member said links are connected at their rear ends; said means comprising rigid hangers fixed on and depending from the tractor to the inside of its rear wheels, an upstanding leg disposed alongside each hanger, and means pivoting corresponding hangers and legs together adjacent their lower ends for swinging movement of said legs in a vertical plane lengthwise of the tractor, the draft links being hingedly attached at their forward ends to the upper end portions of corresponding legs for lateral pivotal movement.

4. A hitch adapted for connection between a tractor and implement, comprising a pair of transversely spaced draft links adapted to be attached at their forward ends to the tractor, and to extend rearwardly therefrom, a draft member adapted to be mounted in relatively vertically rigid and draft relation to the implement, the links being pivotally connected at their rear ends with said member, and means between the links and said member operative to cause relative vertical pivotal movement therebetween.

5. A hitch adapted for connection between a tractor and implement, comprising a pair of transversely spaced draft links adapted to be attached at their forward ends to the tractor, and to extend rearwardly therefrom, a draft member adapted ot be mounted in relatively vertically rigid and draft relation to the implement, the links being pivotally connected at their rear ends with said member, and means between the links and said member operative to cause relative vertical pivotal movement therebetween; said means including a tension screw unit.

6. A hitch adapted for connection between a tractor and implement, comprising a pair of transversely spaced draft links adapted to be attached at their forward ends to the tractor, and to extend rearwardly therefrom, a draft member adapted to be mounted is relatively vertically rigid and draft relation to the implement, the links being pivotally connected at their rear ends with said member, and means between the links and said member operative to cause relative vertical pivotal movement therebetween; said means including an upstanding frame rigidly mounted on said member, and a tension screw unit connected between the links and said frame.

7. A hitch for connection between a wheel tractor and an implement comprising a pair of transversely spaced, rearwardly converging draft links, means to attach the links at their forward ends to the tractor adjacent the rear for lateral hinging movement of said links, a transverse draw bar, means pivotally connecting the links at the rear end to said draw bar for relative vertical pivotal movement therebetween, and an upwardly facing draft plate to which said draw bar is secured, the draft plate being adapted to be fixed in connection with the implement.

8. A hitch for connection between a wheel tractor and an implement comprising a pair of transversely spaced, rearwardly converging draft links, means to attach the links at their forward ends to the tractor adjacent the rear for lateral hinging movement of said links, a transverse draw bar, means pivotally connecting the links at the rear end to said draw bar for relative vertical pivotal movement therebetween, and an upwardly facing draft plate to which said draw bar is secured, the draft plate being adapted to be fixed in connection with the implement; there being means between said plate and the tractor operative to impart side draft of the implement to the tractor adjacent the axis of the rear wheels thereof.

9. A hitch for connection between a wheel tractor and an implement comprising a pair of transversely spaced, rearwardly converging draft links, means to attach the links at their forward ends to the tractor adjacent the rear for lateral hinging movement of said links, a transverse draw bar, means pivotally connecting the links at the rear end to said draw bar for relative vertical pivotal movement therebetween, an upwardly facing draft plate to which said draw bar is secured, the draft plate being adapted to be fixed in connection with the implement, a yoke connected to the plate ahead of the draw bar in vertically swingable but laterally immovable relation, a thrust tongue fixed on and projecting forward from the yoke, and means to transmit lateral thrust of said tongue to the tractor adjacent the axis of its rear wheels.

10. A hitch for connection between a wheel tractor and an implement comprising a pair of transversely spaced, rearwardly converging draft links, means to attach the links at their forward ends to the tractor adjacent the rear for lateral hinging movement of said links, a transverse draw bar, means connecting the links at the rear end to said draw bar, and means including a thrust tongue projecting forwardly from said draw bar between the links operative to transmit side draft of the implement to the tractor adjacent the axis of its rear wheels.

11. A hitch for connection between a tractor and implement comprising a pair of transversely spaced draft links, means on the forward end of the links for attachment to a tractor, a draft member, means for rigidly attaching the draft member to an implement, horizontally disposed pivots between the rear ends of the links and the draft member, a cross bar connected across the links forwardly of said member, a rigid frame fixed to the member and upstanding therefrom, and a tension screw unit interposed between the frame and cross bar and operable to swing the member relative to the links about said horizontal pivots as an axis.

FRANK M. FRAGA.

REFERENCES CITED

The following references are of record in the file of this patent:

UNITED STATES PATENTS

| Number | Name | Date |
|---|---|---|
| 1,378,005 | Bukolt | May 17, 1921 |
| 1,943,594 | Flatley | Jan. 16, 1934 |
| 2,210,907 | Erickson | Aug. 13, 1940 |
| 2,338,334 | Kastenschmidt | Jan. 4, 1944 |
| 2,341,807 | Olmstead | Feb. 15, 1944 |